United States Patent [19]

Kubo et al.

[11] Patent Number: 5,648,581
[45] Date of Patent: Jul. 15, 1997

[54] METHOD FOR VAPOR PHASE POLYMERIZATION OF ALPHA-OLEFIN

[75] Inventors: Kunimichi Kubo, Tokyo; Masahiro Niwa, Yokohama; Eiko Kobayashi, Yokosuka; Mamoru Yoshikawa, Kawasaki, all of Japan

[73] Assignee: Nippon Petrochemicals Company, Limited, Tokyo, Japan

[21] Appl. No.: 598,334

[22] Filed: Feb. 8, 1996

Related U.S. Application Data

[63] Continuation of Ser. No. 174,278, Dec. 28, 1993.

[30] Foreign Application Priority Data

Dec. 29, 1992 [JP] Japan ................... 4-360310

[51] Int. Cl.$^6$ .................. C07C 2/08; C07C 2/22; C07C 2/34
[52] U.S. Cl. .................. 585/501; 585/511; 585/512; 585/520; 585/522
[58] Field of Search ................ 585/501, 921, 585/502, 511, 512, 516, 520, 522, 524; 526/74, 116, 901

[56] References Cited

U.S. PATENT DOCUMENTS

| | | |
|---|---|---|
| 3,708,465 | 1/1973 | Dietrich et al. . |
| 3,971,768 | 7/1976 | Peters et al. ................ 526/68 |
| 4,006,101 | 2/1977 | Matsuura et al. ............ 252/429 C |
| 4,022,958 | 5/1977 | Matsuura et al. ............ 526/124 |
| 4,035,560 | 7/1977 | Caumartin et al. . |
| 4,061,857 | 12/1977 | Kuroda et al. ............... 526/114 |
| 4,065,611 | 12/1977 | Miyoshi et al. .............. 526/124 |
| 4,083,802 | 4/1978 | Matsuura et al. ............ 252/429 C |
| 4,202,953 | 5/1980 | Matsuura et al. ............ 526/125 |
| 4,315,999 | 2/1982 | Matsuura et al. ............ 526/114 |
| 4,396,534 | 8/1983 | Matsuura et al. ............ 252/429 B |
| 4,507,448 | 3/1985 | Kuroda et al. ............... 526/125 |
| 4,532,311 | 7/1985 | Fulks et al. . |
| 5,034,479 | 7/1991 | Eilsinger et al. ............. 526/68 |
| 5,077,358 | 12/1991 | Durand et al. ............... 526/125 |

FOREIGN PATENT DOCUMENTS

| | | |
|---|---|---|
| 0 099 660 A1 | 2/1984 | European Pat. Off. . |
| 0 136 029 A2 | 4/1985 | European Pat. Off. . |
| 0 313 087 A1 | 4/1989 | European Pat. Off. . |
| 0 315 192 A1 | 5/1989 | European Pat. Off. . |
| 0 366 823 A1 | 5/1990 | European Pat. Off. . |
| 0 407 143 A2 | 1/1991 | European Pat. Off. . |
| 0 413 469 A2 | 2/1991 | European Pat. Off. . |
| 0 428 375 A2 | 5/1991 | European Pat. Off. . |
| 0 471 497 A1 | 2/1992 | European Pat. Off. . |
| 0 493 118 A2 | 7/1992 | European Pat. Off. . |
| 0 500 392 A2 | 8/1992 | European Pat. Off. . |
| 0 507 574 A2 | 10/1992 | European Pat. Off. . |
| 0 534 405 A1 | 3/1993 | European Pat. Off. . |
| 2075128 | 10/1971 | France . |
| 2312512 | 12/1976 | France . |
| 56-4608 | 1/1981 | Japan . |
| 1248951 | 10/1971 | United Kingdom . |
| 1248952 | 10/1971 | United Kingdom . |
| 1248953 | 10/1971 | United Kingdom . |
| 2099004 A | 12/1982 | United Kingdom . |
| WO86/07065 | 12/1986 | WIPO . |

*Primary Examiner*—Ponnathapura Achutamurthy
*Attorney, Agent, or Firm*—Fisher, Christen & Sabol

[57] ABSTRACT

A method for polymerizing or copolymerizing α-olefin in a vapor phase condition by supplying to a reactor a catalyst composed of a solid catalyst component containing at least titanium and/or vanadium as well as magnesium and an organic aluminum compound wherein the current due to the electric charge transferred from polymer particles electrified to an electrode disposed at a position where sheet-like polymers will be produced in a reactor, as a result of contact of the polymer particles in the reactor with the electrode is determined, and the polymerization or copolymerization is carried out under such condition where the mean value of current is zero or a positive value. As a result, it becomes possible to prevent production of sheet-like polymers and to stably continue the reaction for polymerization.

19 Claims, 2 Drawing Sheets

METHOD FOR VAPOR PHASE POLYMERIZATION OF ALPHA-OLEFIN

This is continuation of prior U.S. application Ser. No. 08/174,278 filing date Dec. 28, 1993, abandoned.

BACKGROUND OF THE INVENTION

(1) Field of the Invention

The present invention relates to an operating method polymerizing α-olefin by vapor phase polymerization, and more particularly to an operating method by which production of a sheet-like polymer in an area close to the inner wall of its reactor in the case when α-olefin is polymerized or copolymerized by the use of a vapor phase fluidized bed may be reduced, and unstable reaction of such polymerization may be prevented from occurring.

(2) Description of the Related Art

It has been disclosed, for example, in EP-A No. 224479 that an absolute value of electrostatic potential during a polymerization reaction has to be maintained in zero condition, in other words, a polarity of existing voltage has to be kept neutral in order to prevent production of sheet-like polymers in an area close to the inner wall of its reactor.

In the event of polymerizing α-olefin by using a vapor phase fluidized bed, there is such a case where sheet-like polymers are produced in an area close to the inner wall of its reactor especially at the beginning of the polymerization, and then a port for drawing out polymer and the downstream piping therefor are clogged with such sheet-like polymers so that the polymerization reaction cannot substantially be continued anymore. Such production of sheet-like polymers is frequently observed within a period after a solid catalyst component and an organic aluminum compound are supplied into a reactor in a state where substantially no polymerization occurs, then, the polymerization is initiated, and before about twenty times higher volume of a polymer than that of a reacting zone of its fluidized bed are produced. Thereafter, production of sheet-like polymers decreases comparatively after a condition of the reaction transfers to its steady state.

If the polyolefin particles in a reactor are electrified, it is known that such electrified particles adhere to another substance by electrostatic forces. Accordingly, it is supposed that there is a relationship between the electrified polyolefin particles in the reactor and production of sheet-like polymers in an area close to the inner wall of the reactor.

In this connection, first, behavior of electrified polyolefin particles in a vapor phase fluidized bed as well as production of sheet-like polymers will be described in detail hereinbelow.

In a vapor phase fluidized bed reactor, electric charge arises due to contact and/or friction between polymer particles as well as between polymer particles and the inner wall of the reactor so that these polymer particles are electrified, respectively. When these particles possess a high amount of electric charge and the number of particles electrified increases, such electrified polymer particles come to adhere to the inner wall of the reactor due to Coulomb forces. The velocity of the gas stream becomes slow in an area close to the inside wall of the vapor phase fluidized bed reactor so electrified polymer particles adhere much more easily to the inside wall of the reactor.

However, such adhering of electrified polymer particles to the inner wall of a reactor does not directly relate to production of sheet-like polymers. Even if polymer particles have adhered to the inside wall of a reactor, when a temperature in a layer of such adhered polymer particles does not exceed a melting point of the resulting polymer, no sheet-like polymer is produced. This result as described above is obtained in such a case where a concentration of catalyst used is low in a relevant area, in other words, an amount of reaction is small in the area and as a consequence, associated heat of polymerization can be removed.

On the other hand, when electrified polymer particles adhere to the inside wall of a reactor due to Coulomb forces and a concentration of the catalyst used in a layer of the adhered polymer particles is high, a polymerization reaction proceeds, and as a result it becomes difficult to remove the heat of the polymerization. Consequently, the temperature in the layer of adhered polymer particles rises. Finally, such temperature reaches one which exceeds the melting point of the polymer, and the polyolefin particles fuse together to form a sheet-like polymer. While the expression "concentration of catalyst" has been used herein, in reality, when a catalyst is supplied into a reactor, polymerization begins promptly to form polymer particles in the presence of the catalyst, and these particles continue further polymerization. More specifically, even if a concentration of catalyst supplied is low in a relevant area, production of sheet-like polymers is observed after all in the case where a concentration of polyolefin particles having polymerizing activity is high in the area. For this reason, a more pertinent expression might be "concentration of active sites for polymerization" or "amount of reaction per unit volume", but not "concentration of catalyst". In any event, the concentration in this case means the concentration of solid catalyst component which have been supplied to a reactor as well as the concentration of the resulting polyolefin particles having polymerizing activity. In this respect, the term "concentration of catalyst" does not mean simply hereunder that of the catalyst, but also includes a concentration of polyolefin particles having polymerizing activity.

It is, however, to be noted that while such polymerization as described above proceeds under these circumstances, production of sheet-like polymers requires further accumulation of heat of polymerization, in other words, it is required for the production of sheet-like polymers that such polyolefin particles adhere to the inside wall of a reactor in the form of a layer with a certain degree or more of thickness. Accordingly, there is no production of sheetlike polymers with such thickness of a thin layer of the adhered polyolefin particles after all.

With respect to such adherence of polyolefin particles in the form of a layer with a certain degree of thickness, to be noted is coexistence of particles which have been electrified positively and other particles which have been electrified negatively in the electrified polymer particle group in a reactor.

For the following explanation, polyolefin particles which have been merely electrified either positively or negatively as a group will be assumed herein. As a matter of course, such particles may adhere onto the inner wall of a reactor to form the first layer thereof due to Coulomb forces. However, even if other electrified polymer particles approach the first layer, further adherence never occurs as a result of action of repulsion force due to Coulomb forces because these particles have the same polarity of electric charge. Thus, the polymer particles adhere to the reactor inside wall with merely a thickness of a single layer in the case where all the existing particles are ones which have been electrified in only the same polarity. From the above description, it will be appreciated that coexistence of particles which have been electrified positively and ones which have been electrified negatively as a group of polyolefin particles is a requirement for adherence of such polymer particles in a reactor on the inside wall of a reactor with a layer having a certain degree of thickness. In addition, it is to be noted that since polymer is an insulating material, it is hard to occur the transfer electric charge in the polymer and its surface. However, when such polyolefin particles are in contact with a conductive material such as an electrode which will be described later, at least a part of the electric charge at the site being in the contact state transfers immediately to the electrode. Accordingly, there may be such a case where one polymer particle includes a plural number of electric charges. In this case, the plural number of electric charges may be different from one another in their signs (polarities). More specifically, there is a case where a positive and negative electric charge coexist within one polymer particle.

From the fact that production of sheet-like polymers is observed in an actual vapor phase polymerization of polyolefin, it is considered that an electrified state of the polyolefin particles in vapor phase polymerization is also a complicated electrified state in that both a positive and a negative electric coexist in one polymer particle as described above.

Therefore, it is important to have a good grasp of an electrified state of polymer particles such as coexistence of positive and negative electric charges in view of a countermeasure on how to cope with adherence of polymer particles to the inner wall of a reactor which might lead to production of sheet-like polymers.

Heretofore, there have been two methods for measuring an electrified state of particles and both of them are each for measuring electrostatic potential One method is a (non-contact way) method for measuring electrostatic potential of particles without being in contact with the particles which are the object to be measured. The other is a (contact way) method for measuring electrostatic potential with contacting of the particles to be measured. The term "electrostatic potential" used herein means one which is due to particles electrified and in this case, potential of the earth is considered to be zero as the reference potential. This may be also called by the term "electrostatic voltage", and which is hereinafter referred to simply as "potential".

In the event where a disaster due to discharge of static electricity of particles are prevented from occurring, potential of the particles is a very important factor. This is because discharge of electricity is established to lead a cause for disaster, when potential of electrified particles exceeds electric breakdown voltage between particles and the earth. In other words, electric field strength of the electrified particles exceeds electric breakdown strength between particles and the earth. In such a case, a conventional method for measuring potential is optimum as a method for measuring a state of electrified particles.

However, the conventional method for measuring potential is not suitable for one for measuring a state of polymer particles electrified in a complicated situation. This will be amplified hereinbelow by exemplifying the conventional measuring method.

As a non-contact measuring method, there is, for example, a manner wherein electric field due to electric charge of an object to be measured which has been electrified is measured by using an electrostatic field meter, and potential of the object to be measured is determined by the electrostatic field measured and a distance extending therefrom to the object to be measured. The above described method will be described further by referring to FIG. 1, wherein +q designates an amount of electric charge in a charged particle 1. In this connection, FIG. 1 illustrates an example of a non-contact way potential measuring method. In general, since an electrostatic field meter 2 is connected to the earth ground 3, when strength of electric field and a distance extending therefrom to an object to be measured are expressed by E [V/m] and d [m], respectively, an electric potential difference, i.e. potential V [V] is determined as follows:

$$V = E \times d$$

However, in the case where an electrified state of polymer particles (group) is measured in accordance with a noncontact way potential measuring method, there is such a problem that measurements may be significantly out of order if the polymer particles being the object to be measured come to be in contact with a measuring section of the electrostatic field meter even though the meter is non-contact type. A cause for the problem is electric charge transferred or produced as a result of the contact between the polymer particles and the measuring section of the electrostatic field meter used. For this reason, such noncontact type meter is not generally used for measuring potential of particles.

On the other hand, a conventional contact way measuring method is one wherein an electrometer is connected with an electrode which is in contact with the polymer particles being the object to be measured to determine potential as described in, for example, the above-mentioned EP-A No. 224479. Such contact way measuring method is one for measuring potential of the electrode to which has been transferred electric charge from the polymer particles. FIG. 2 illustrates a contact way potential measuring method. As shown in FIG. 2, an electrometer 6 is connected to an electrode 5 which is inserted into a reactor 4. Further, the electrometer 6 is also connected to earth ground 3. The charged particles fluidized in a reactor (not shown) are brought into contact with an electrode.

In this method, the electric charge which has been transferred from polymer particles to an electrode accumulates in the electrostatic capacitor which is formed between the earth ground and a measuring system composed of electrodes, an electrometer, wirings for the electrodes and electrometer, and the like components so that potential in the measuring system changes. When the potential of an electrode changes, an amount of electric charge transferred from polymer particles changes in even the case where such polymer particles having the same amount of electric charge comes in contact with the electrode. In addition, frequency of contact of polymer particles with the electrode varies under the influence of Coulomb force. Furthermore, an amount of electric charge leaking from the measuring system varies also in accordance with changes in potential of the measuring system. Finally, potential of the electrode in the case when equilibrium is established by both the amount of electric charge transferred from the polymer particles to the electrode and the amount of electric charge leaking from the measuring system is obtained as a measured value.

It is, however, necessary for paying attention to the fact that the measured value of potential thus obtained is such potential of an electrode in the event where equilibrium is established by both the amount of electric charge transferred from the polymer particles to the electrode and the amount of electric charge leaking from the measuring system, but it is never the potential of polymer particles (group) existing nearby the electrode after all.

Such measured potential value of polymer particles (group) is affected by electrostatic capacity between the polymer particles (group) and ground. More specifically, even if polymer particles (group) have the same amount of electrification, when the electrostatic capacity appearing with respect to ground changes (electrostatic capacity varies also due to a shape, volume and a correlative relationship in position of a reactor), measured potential value of the polymer particles (group) changes accordingly.

Now, what is meant by measurements in the present method will be described in conjunction with the circuit diagram shown in FIG. 3 wherein C [F] designates electrostatic capacity of a capacitor formed between the measuring system and earth ground, and R [Ω] designates insulation resistance of the measuring system. The circuit diagram shown in FIG. 3 is electrically equivalent to the diagram of FIG. 2. In this case, each polymer particle has a constant amount of positive electric charge, and it is assumed that the initial potential of an electrode is zero.

With accumulation of electric charge as a result of transferring of the same from polymer particles to the capacitor formed between the measuring system and earth ground, potential of the electrode increases. When an amount of electric charge accumulated in the capacitor is designated by q [C], potential V [V] of the electrode is expressed by V=q/C.

With increase of the potential of the electrode, the repulsive force acting between the electrode and the polymer particles increases so that the polymer particles become difficult to be in contact with the electrode. In addition, such amount of electric charge which transfers to the electrode in the case when the polymer particles are in contact therewith decreases also. For this reason, an amount of electric charge transferring to the electrode per unit time, i.e. current $I_{in}$ derived from the electrode varies dependent on the potential V of the electrode. This may be expressed by $I_{in}$=f(V) in accordance with a function f(V).

Leakage current $I_{out}$ from the measuring system may also be a function of the potential of the electrode, and this is expressed by $I_{out}$=V/R in accordance with Ohm's law. Finally, a measured value of potential becomes the potential V of the electrode in the case where $I_{in}-I_{out}$=0, i.e.

$$f(V)=V/R \qquad (I)$$

is valid.

In this case, the function f(V) expressing transfer of electric charge from polymer particles to an electrode having potential V is fixed dependent upon the electrode used for the measurement, types of polymer, an electrified state of the polymer particles.

In the case where Equation I is in such a form which includes no variable other than the function f(V) and the potential V, when the electrode and a type of the polymer are fixed, the measured value V is determined uniquely with respect to an electrified state of polymer particles. However, Equation I includes an insulation resistance R of the measuring system other than the function f(V). This means that the measured value, i.e. the potential V of electrode which satisfies Equation I is affected by an insulation resistance of the measuring system. Namely, this means that when the insulation resistance of the measuring system is not kept constant, the measured value V is not uniquely determined with respect to the electrified state of polymer particles even if the electrode and the types of polymer are fixed.

In other words, it may be concluded that measured values cannot be directly compared with each other in such a contact way method for measuring potential as mentioned above so far as its measuring system is specified, and its condition is kept constant. Accordingly, it may be said that direct comparison of the resulting measured values is extremely difficult in the contact way method for measuring potential described in the aforesaid EP-A No. 224479 from the theoretical point of view.

In either measuring method of contact or non-contact way as described above, measurements are obtained in the form of potential or voltage. Such measurements of potential are, however, based on a difference between positive and negative electric charge as its polymer particle group. Accordingly, it may be concluded that these methods are not suitable for one for measuring a complicated electrified state of a polymer particle group in which there is coexistence of positive and negative electric charge. Besides balance between positive and negative electric charge is important with respect to adherence of the polymer particles to the inside wall of a reactor.

In this connection, when, for example, such polymer particle groups composed of coexisting electrically equivalent numbers of polymer particle groups each of which is positively and negatively electrified are imagined and these polymer particle groups are measured by a method for measuring potential, the resulting measured value is theoretically zero as potential. This is because a difference between positive and negative electric charge is zero irrespective of the aforesaid contact and non-contact way methods.

According to the aforesaid EP-A No. 224479, prevention of producing sheet-like polymers is attained by keeping its electrostatic potential neutral. Accordingly, it may be considered that there is no sheet-like polymer produced in the case as described above where electrically equivalent number of polymer particle groups coexist so that its electrostatic potential is neutral. However, since such polymer particles each of which is positively and negatively electrified coexist, it is highly possible that thick adherence of polymer particles onto the inside wall of a reactor as mentioned above will occur in this case.

As described above, it is uncertain and difficult to accomplish prevention of producing a sheet-like polymer in the case of vapor phase polymerization of α-olefin in accordance with measurement of potential.

Meanwhile a mechanism for generating static electricity has not yet been elucidated in general, and there is the same tendency as to vapor phase polymerization of polyolefin.

Accordingly, fundamental elucidation of a mechanism for generating static electricity and countermeasures for preventing generation of static electricity based on such elucidation are inevitably insufficient and incomplete. Consequently, we must study a manner for dealing with and solving the problem of generating static electricity on the premise that polymer particles are electrified.

On the other hand, there is such a case where minute current flowing through an electrode is measured for determining an amount of electric charge in a field relating to electrostatic phenomena. This is because it may also be considered that current is differential of an amount of electric charge transferred with respect to time. Therefore, minute current is measured, and the measured value is integrated with time, whereby a minute amount of electric charge transferred can be calculated. In case of measuring an amount of electric charge, generally a direction along which current flows, i.e. a direction along which electric charge transfers and measurements of current do not change in a short period of time.

On the contrary, in the case where a direction along which electric charge transfers and a value of current itself vary remarkably in a short period of time, it is difficult to obtain an effective value as an amount of electric charge even if a determined current value is integrated with time. Thus, heretofore utilization of a method for measuring current has been limited to such a case where a direction along which electric charge transfers and measurements of current vary slightly within a short period of time.

We noted this measuring method by which transfer of minute electric charge can be determined, and studied applying the measuring method to measurement of an electrified state of polymer particles.

In case of electricity served for daily use, mutual conversion of current and voltage is easy as is apparent from the fact that a typical voltmeter is composed of an ammeter and a resistor having a high resistance value. This is because a relationship between voltage and current has been formulated through the mediation of resistance (impedance).

In general, however, mutual conversion of current measurement values according to the method used in the present invention to those of conventional potential and electrostatic voltage is impossible. This is because these respective measurements are simply in the form of current or voltage as a manner for expressing an electrified state of polymer particles, and their measuring principles are quite different from one another.

OBJECT AND SUMMARY OF THE INVENTION

It is an object of the present invention to provide a stable operating method for vapor phase polymerization of α-olefin by which a problem of producing sheet-like polymers at especially an early stage of the reaction is solved in the case of polymerizing α-olefin by the use of the vapor phase fluidized bed reactor as described above.

As a result of our eager study for accomplishing the above described object, the present inventors have attained the present invention based on such finding that a mean value of current due to the electric charge transferred from electrified polymer particles to an electrode which is disposed at a specified position within a reactor is adjusted to be maintained at a certain level or more, whereby production of sheet-like polymers can be suppressed.

More specifically, according to the first aspect of the present invention, there is provided a method for polymerizing or copolymerizing α-olefin in vapor phase condition by supplying to a reactor a catalyst composed of a solid catalyst component containing at least titanium and/or vanadium as well as magnesium and an organic aluminum compound, characterized by determining current due to the electric charge transferred from electrified polymer particles to an electrode disposed at a position where sheet-like polymers will be produced in a reactor as a result of contact of said polymer particles in the reactor with said electrode, thereby polymerizing the α-olefin under such condition where said mean value of current is zero or a positive value.

According to the second aspect of the present invention, there is provided a method for polymerizing α-olefin in vapor phase condition wherein said organic aluminum compound is an alkyl aluminum.

According to the third aspect of the present invention, there is provided a method for polymerizing α-olefin in vapor phase condition wherein said catalyst is composed of a solid catalyst component containing a tetravalent titanium compound and a magnesium halide as well as an alkyl aluminum.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
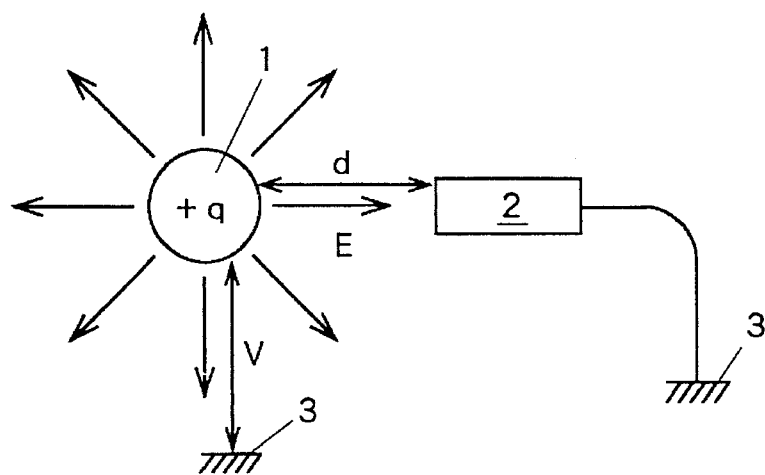
FIG. 1 is a schematic diagram for explaining a conventional non-contact measuring method of potential.
Figure 2:
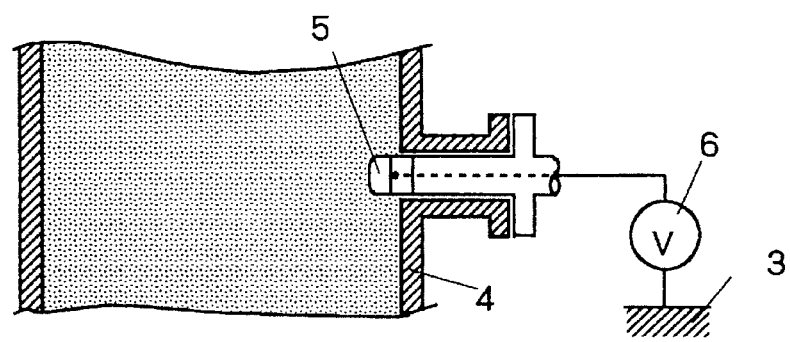
FIG. 2 is a schematic diagram for explaining a conventional contact measuring method of potential.
Figure 3:
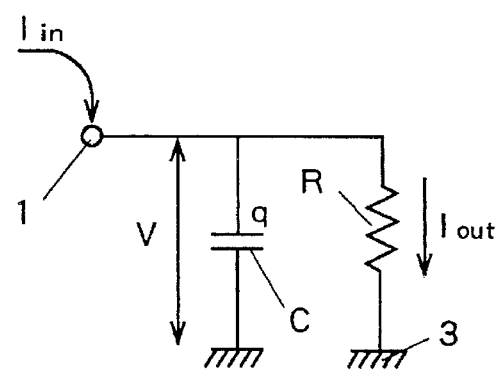
FIG. 3 is a circuit diagram which is electrically equivalent to the device in FIG. 2.

The reactor used for polymerizing or copolymerizing α-olefin in a vapor phase condition in the present invention includes any type of fluidized bed or agitated bed reactors which are substantially operated in a gas-solid system, and they may be or not may be equipped with an agitator.

The α-olefins used in the present invention have 2 to 8 carbon atoms, preferably 2 to 6 carbon atoms. For example, ethylene, propylene, butene-1, pentene-1, hexene-1, and 4-methylpentene-1 are used. These can be used singly for homopolymerization or for copolymerization of two or more kinds of them. The combinations of monomers for copolymerization are exemplified by those of ethylene and an α-olefin having 3 to 12 carbon atoms such as ethylene/propylene, ethylene/butene-1, ethylene/hexene-1, and ethylene/4-methylpentene-1; propylene/butene-1; and the combination of ethylene and two kinds or more of α-olefins.

Furthermore, it is possible to copolymerize with dienes for the purpose to improve the properties of polyolefin. Exemplified as the dienes are butadiene, 1,4-hexadiene, ethylidenenorbornene, and dicyclopentadiene.

The feeding of olefins into the reaction system is preferably carried out together with a suitable inert carrier gas such as nitrogen.

The catalysts used for the above polymerization of α-olefins are composed of an organoaluminum compound and solid catalyst components which contain at least one or both of titanium and vanadium and magnesium. The solid catalyst components containing at least titanium and/or vanadium; and magnesium are exemplified by a catalyst component containing titanium and magnesium which is well known as a Ziegler type catalyst for the polymerization of olefins, a catalyst component containing vanadium and magnesium, and a catalyst component containing titanium, vanadium and magnesium.

More particularly, the above catalyst components are prepared by adding a titanium compound and/or vanadium compound on a carrier of magnesium-containing inorganic solid compounds such as metallic magnesium, magnesium hydroxide, magnesium carbonate, magnesium oxide, and magnesium chloride, or double salts, double oxides, carbonates, chlorides and hydroxides containing magnesium and an element selected from silicon, aluminum, and calcium, or those obtained by treating or reacting the above inorganic solid compounds with an oxygen-containing compound, sulfur-containing compound, aromatic hydrocarbon or halogen-containing compound.

The above-mentioned oxygen-containing compounds are exemplified by water; polysiloxane; organic oxygen-containing compounds such as alcohols, phenols, ketones, aldehydes, carboxylic acids, esters, and acid amides; alkoxides of metals; and inorganic oxygen-containing compounds such as oxychlorides of metals. The sulfur containing compounds are exemplified by organic sulfur-containing compounds such as thiols and thioethers and inorganic sulfur-containing compounds such as sulfur dioxide, sulfur trioxide, and sulfuric acid. The aromatic hydrocarbons are exemplified by monocyclic or polycyclic aromatic hydrocarbons such as benzene, toluene, xylene, anthracene, and phenanthrene. The halogen-containing compounds are exemplified by chlorine, hydrogen chloride, metal chlorides, and organic halides.

The foregoing titanium compounds are exemplified by halides, alkoxy halides, alkoxides, and oxychlorides of titanium. Among them, tetra-valent titanium compounds and tri-valent titanium compounds are preferably used. The tetra-valent titanium compounds are represented by the general formula:

$$Ti(OR)_nX_{4-n}$$

in which R is a hydrocarbon radical such as an alkyl group, aryl group or aralkyl group having 1 to 20 carbon atoms, X is a halogen atom and n is a numeral of $0 \leq n \leq 4$.

More particularly, the titanium compounds are exemplified by titanium tetrachloride, titanium tetrabromide, titanium tetraiodide, trichlorotitanium monomethoxide, dichlorotitanium dimethoxide, monochlorotitanium trimethoxide, titanium tetramethoxide, trichlorotitanium monoethoxide, dichlorotitanium diethoxide, monochlorotitanium triethoxide, titanium tetraethoxide, trichlorotitanium monoisopropoxide, dichlorotitanium diisopropoxide, monochlorotitanium triisopropoxide, titanium tetraisopropoxide, trichlorotitanium monobutoxide, dichlorotitanium dibutoxide, monochlorotitanium tributoxide, titanium tetrabutoxide, trichlorotitanium monopentoxide, trichlorotitanium monophenoxide, dichlorotitanium diphenoxide, monochlorotitanium triphenoxide, and titanium tetraphenoxide.

The tri-valent titanium compounds are represented by the general formula:

$$Ti(OR)_mX_{4-m}$$

in which R is a hydrocarbon radical such as an alkyl group, aryl group or aralkyl group having 1 to 20 carbon atoms, X is a halogen atom and m is a numeral of $0<m<4$. These compounds are exemplified by tri-valent titanium compounds which are prepared by reducing halogenated titanium alkoxides with hydrogen, aluminum, titanium or organometallic compounds of the group I to III of the periodic table.

Among the above titanium compounds, the tetra-valent titanium compounds are preferable.

More particularly, the catalysts are exemplified by those prepared by combining organoaluminum compounds with solid catalyst components of:

$MgO$—$RX$—$TiCl_4$ (U.S. Pat. No. 4,065,611),
$Mg$—$SiCl_4$—$ROH$—$TiCl_4$,
$MgCl_2$—$Al(OR)_3$—$TiCl_4$ (U.S. Pat. No. 4,202,953),
$MgCl_2$—$SiCl_{4-ROH-TiCl4}$ (U.S. Pat. Nos. 4,006,101 and 4,083,802)
$Mg(OOCR)_2$—$Al(OR)_3$—$TiCl_4$ (U.S. Pat. No. 4,022,958),
$Mg$—$POCl_3$—$TiCl_4$,
$MgCl_2$—$AlOCl$—$TiCl_4$ (U.S. Pat. No. 4,061,857),
$MgCl_2$—$Al(OR)_nX_{3-n}$—$Si(OR')_mX_{4-m}$—$TiCl_4$ (U.S. Pat. No. 4,507,448)

in which R and R' are organic residual groups and X is a halogen atom.

The foregoing vanadium compounds are exemplified by tetra-valent vanadium compounds such as vanadium tetrachloride, vanadium tetrabromide, and vanadium tetraiodide; and penta-valent vanadium compounds such as vanadium oxytrichloride and orthoalkyl vanadate; and tri-valent vanadium compounds such as vanadium trichloride and vanadium triethoxide.

The vanadium compounds can be used singly or in combination with the titanium compounds.

Exemplary as other catalysts are the combination of organoaluminum compounds with a solid catalyst component prepared by reacting an organomagnesium compound of the so-called Grignard reagent with a titanium compound and/or a vanadium compound. The organomagnesium compounds are exemplified by the compounds represented by the general formulae: $RMgX$, $R_2Mg$ and $RMg(OR)$, in which R is an organic radical having 1 to 20 carbon atoms and X is a halogen atom, and their ether complexes, and other compounds which are prepared by modifying the above organomagnesium compounds with other organometallic compounds such as organosodium, organolithium, organopotassium, organoboron and organocalcium.

Typical examples of the above catalysts are the compounds prepared by combining an organoaluminum compound with a solid catalyst component such as $RMgX$—$TiCl_4$ type, $RMgX$-phenol-$TiCl_4$ type, $RMgX$-halogenated phenol-$TiCl_4$ type and $RMgX$—$CO_2$—$TiCl_4$ type.

Other catalyst systems are exemplified by the combination of an organoaluminum compound with a solid substance which is obtained by reacting an inorganic oxide as a solid catalyst component such as $SiO_2$, $Al_2O_3$ and $SiO_2 \cdot Al_2O_3$ with the above-described solid catalyst component containing magnesium and titanium and/or vanadium. Besides the above inorganic oxides of $SiO_2$, $Al_2O_3$ and $SiO_2 \cdot Al_2O_3$; $CaO$, $Ba_2O_3$ and $SnO_2$ are also used. Furthermore, the double oxides of the above oxides can also be used. These inorganic oxides are brought into contact with the solid catalyst component containing magnesium and titanium and/or vanadium through a well-known method. More particularly, the reaction is carried out at a temperature in the range of 20° to 400° C., preferably 50° to 300° C., generally for 5 minutes to 20 hours with or without an organic solvent such as an inert hydrocarbon, alcohol, phenol, ether, ketone, ester, amine, nitrile or a mixture of them. The reaction may be carried out by any suitable method such as performing ball milling of all component materials.

Practical examples of the above catalyst systems are the combination of an organoaluminum compound with a solid catalyst component exemplified as follows:

$SiO_2$—$ROH$—$MgCl_2$—$TiCl_4$ (U.S. Pat. No. 4,315,999),
$SiO_2$—$ROR'$—$MgO$—$AlCl_3$—$TiCl_4$ (British Patent No. 2,099,004),
$SiO_2$—$MgCl_2$—$Al(OR)_3$—$TiCl_4$—$Si(OR')_4$ (U.S. Pat. No. 4,396,534),
$SiO_2$—$TiCl_4$—$R_nAlCl_{3-n}$—$MgCl_2$—$Al(OR')_nCl_{3-n}$ (EP-A No. 407143),
$SiO_2$—$TiCl_4$—$R_nAlX_{3-n}$—$MgCl_2$—$Al(OR')_nCl_{3-n}$—$Si(OR'')_nCl_{4-n}$ (EP-A No. 413469),
$SiO_2$—$MgCl_2$—$Al(OR')_nCl_{3-n}$-Ti(OR'')_4$—$R_nAlCl_{3-n}$ (EP-A No. 428375)
$SiO_2$—$MgCl_2$—$Al(OR')_nCl_{3-n}$—$Ti(OR'')_nCl_{4-n}$—$R_nAlCl_{3-n}$ (EP-A No. 428375)
$SiO_2$—$TiCl_4$—$R_nAlCl_{3-n}$—$MgCl_2$—$Al(OR')_nCl_{3-n}$—$R'''_nSi(OR'')_nX_{4-(m+n)}$ (EP-A No. 493118)
$SiO_2$—$R_nMgX_{2-n}$—$Al(OR')_nCl_{3-n}$—$Ti(OR'')_nCl_{4-n}$—$R'''OH$—$R_nAlX_{3-n}$ (EP-A No. 507574)

SiO$_2$—MgCl$_2$—Al(OR')$_n$Cl$_{3-n}$—Ti(OR")$_n$Cl$_{4-n}$—R'''OH—R$_n$AlCl$_{3-n}$—Al(OR')$_n$Cl$_{3-n}$ (EP-A No. 500392)

in which R, R', R" and R''' are hydrocarbon residual groups, respectively.

In these catalyst systems, the compounds of titanium and/or vanadium can be used as the adducts of organic carboxylic esters. Furthermore, it is possible to use the foregoing inorganic solid compounds after bringing the compounds into contact with organic carboxylic acid esters. Still further, the organoaluminum compounds can be used as an adduct with an organic carboxylic acid ester. In other words, the catalyst systems which are prepared in the presence of organic carboxylic acid esters can be used.

The organic carboxylic acid esters used herein are exemplified by the esters of aliphatic, alicyclic and aromatic carboxylic acids. Among all, aromatic carboxylic acid esters having 7 to 12 carbon atoms are preferable, which are exemplified by alkyl esters such as methyl ester and ethyl ester of benzoic acid, anisic acid, and toluic acid.

The organoaluminum compounds used together with the above-described solid catalyst components are those having at least one aluminum-carbon bond in the molecule.

For example, they are exemplified by:

(i) organoaluminum compounds represented by the general formula:

$$R_mAl(OR')_nH_pX_q$$

in which each of R and R' is a hydrocarbon group having 1 to 15 carbon atoms, preferably 1 to 4 carbon atoms such as alkyl, aryl, alkenyl, or cycloalkyl group. The alkyl groups are exemplified by methyl, ethyl, propyl, isopropyl, isobutyl, sec-butyl, tert-butyl, hexyl and octyl groups. R and R' may be either the same or different ones. X is a halogen atom. The symbols m, n, p and q are, respectively, 0<m≦3, 0≦n<3, 0≦p<3, and 0≦q<3 as well as (m+n+p+q)=3, and (ii) alkylated complexes of a metal of the group I of the periodic table with aluminum which is represented by the general formula:

$$MAlR_4$$

in which M is a metal selected from the group of Li, Na and K, and R is the same hydrocarbon group as the above.

Exemplified as the organoaluminum compounds belonging to the above (i) are:

General formula: R$_m$Al(OR')$_{3-m}$ in which each of R and R' is the same hydrocarbon group as the above one and m is a numeral preferably in the range of 1.5≦m≦3.

General formula: R$_m$AlX$_{3-m}$ in which R is the same hydrocarbon group as the above one, X is a halogen atom and m is a numeral preferably in the range of 0<m<3.

General formula: R$_m$AlH$_{3-m}$ in which R is the same hydrocarbon group as the above one and m is a numeral preferably in the range of 2≦m<3.

General formula: R$_m$Al(OR')$_n$X$_q$ in which R is the same hydrocarbon group as the above one, X is a halogen atom, and each of m, n and q is a numeral preferably in the ranges of 0<m≦3, 0≦n<3, and 0≦q<3 and (m+n+q)=3.

The organoaluminum compounds belonging to the group (i) are exemplified by trialkylaluminums such as trimethylaluminum, triethylaluminum, triisopropylaluminum, triisobutylaluminum, tri-sec-butylaluminum, tri-tert-butyl aluminum, trihexylaluminum and trioctylaluminum; trialkenylaluminum; dialkylaluminum alkoxides such as diethylaluminum ethoxide and dibutylaluminum butoxide; alkylaluminum sesquialkoxide such as ethylaluminum sesquiethoxide and butylaluminum sesquibutoxide as well as partially alkoxylated alkylaluminum represented by the average composition of R$_{2.5}$Al(OR)$_{0.5}$; dialkylaluminum halides such as diethylaluminum chloride, dibutylaluminum chloride, and diethylaluminum bromide; partially halogenated alkylaluminums such as ethylaluminum sesquichloride, butylaluminum sesquichloride, ethylaluminum sesquibromide; partially hydrogenated alkylaluminums such as dialkylaluminum hydrides of diethylaluminum hydride and dibutylaluminum hydride and alkylaluminum dihydrides such as ethylaluminum dihydride and propylaluminum dihydride; and partially alkoxylated or halogenated alkylaluminums such as ethylaluminum ethoxychloride, butylaluminum butoxychloride, and ethylaluminum ethoxybromide.

The organoaluminum compounds belonging to the above group (ii) are exemplified by LiAl(C$_2$H$_5$)$_4$ and LiAl(C$_7$H$_{15}$)$_4$.

As the above organoaluminum compounds belonging to the above (i), it is possible to use the compounds in which two or more aluminum atoms are bonded through oxygen atoms or nitrogen atoms can also be used, which compounds are exemplified by (C$_2$H$_5$)$_2$AlOAl(C$_2$H$_5$)$_2$, (C$_4$H$_9$)$_2$AlOAl(C$_4$H$_9$)$_2$, and (C$_2$H$_5$)$_2$AlN(C$_2$H$_5$)Al(C$_2$H$_5$)$_2$.

Among the above-mentioned compounds, trialkylaluminums are most preferable.

The quantity of organoaluminum compound to be used in regular operation is not limited, however, it may be in the range from 0.05 to 1000 moles per 1 mole of titanium compound.

The polymerization according to the present invention is carried out in the like manner as the ordinary polymerization of olefins in the presence of Ziegler type catalyst. That is, the reaction is substantially carried out under a vapor phase condition. Concerning other polymerization conditions, the temperature is in the range of 10° to 200° C., preferably 40° to 150° C. and the pressure is in the range from the normal pressure to 70 kg/cm$^2$·G, preferably 2 to 60 kg/cm$^2$·G.

The regulation of molecular weight can be attained effectively by adding hydrogen into a polymerization system although it can be done to some extent by changing the polymerization conditions such as temperature, molar ratios of catalysts or the like.

α-Olefins, solid catalyst components and organoaluminum compound are introduced constantly into the reaction system during the regular operation, meanwhile the produced polymer particles are taken out from the polymerization system.

In the polymerization of α-olefins in a fluidized bed reactor, the reactor is previously fed with the so-called seed polymer of resin particles to start fluidization, and the polymerization is then started by continuously feeding the reactor with mixed gases as raw materials, solid catalyst components and an organoaluminum compound as a cocatalyst. Because the catalysts are hardly dispersed, in the case that the seed polymer is not used, granular resin cannot be formed and the fluidized bed cannot be formed either. Accordingly, when the fluidized bed polymerization reactor is used, the seed polymer is inevitably fed into the reactor in the initial stage of polymerization.

Incidentally, the seed polymer used in the present invention which is fed into the reactor prior to the start of polymerization, is not especially limited as far as it can form a fluidized bed or a stirred bed. However, the polyolefin particles, especially those having the same properties as those of the product to be prepared, is preferably used as the seed polymer in general.

The seed polymer used in the present invention preferably has an average particle diameter of 500 to 1500 μm and a bulk density of 0.25 to 0.5 g/cm³. The use of seed particles of smaller than 500 μm in average particle diameter is not preferable.

The quantity of the seed polymer is not especially limited as long as it can form a fluidized bed or stirred bed.

After feeding a seed polymer, nitrogen purging is done in order to eliminate entrained oxygen and, by raising the temperature and pressure, the conditions of gas composition and temperature for polymerization are attained. After that, the polymerization is started by feeding a predetermined quantity and rate of olefin gases, solid catalyst component and organoaluminum compound.

After the feeding of seed polymer, the order of feeding of the solid catalyst component, organoaluminum compound and olefin gases can be done arbitrarily. For example, the solid catalyst component, organoaluminum compound and olefin gases which are diluted with proper inert gas are simultaneously fed, or the organoaluminum compound is fed in the first place, and the solid catalyst component is fed thereafter, or the solid catalyst component is firstly fed and the organoaluminum compound is then fed.

According to the present invention, a stainless electrode is inserted into a reactor for polyolefin of vapor phase fluidized bed type, and when such current due to the electric charge transferred from polymer particles to the electrode is measured, measurements of the current varies frequently within an extent of positive and negative polarities. As a matter of course, the measurements oscillate or vary positively and negatively on the basis of neutral level (value zero) in the case where sheet-like polymers are produced, and furthermore the same behavior is observed in even the case where stable operation is continued. When the measurements of current are plotted as ordinate and the time as abscissa, the measurements distribute in positive and negative ranges across value zero. Namely, this fact suggests coexistence of polymer particles electrified positively and ones electrified negatively in a polymer particle group.

As a result of measuring current values, there was a correlation between an amplitude of the measurements of oscillating current and an amount of adhering polymer particles onto the inner wall of a reactor. More specifically, it has been found that when the amplitude of the measurements of oscillating current is wide, an amount of the polymer particles adhered increases, while when the amplitude is narrow, an amount of the polymer particles adhered decreases. In this case, an amount of polymer particles adhering to the inner wall of a reactor may be determined by measuring differential pressure which will be described later.

A large value of amplitude of oscillating current means that the electric charge of mingled particle groups electrified positively and negatively is large. In this case, accordingly, it is considered that thick adherence of polymer particles to the inside wall of a reactor occurs easily as mentioned above. When differential pressure is actually measured to determine an amount of polymer particles adhering to a reactor inside wall, the amount adhered is large so that the above-mentioned explanation may be considered to be correct.

Conventional thinking for preventing production of sheet-like polymers including the aforesaid EP-A No. 224479 is to reduce simply adherence of polymer particles to the inside wall of a reactor as a fundamental solution. If such a way of fundamental thinking is adopted, it is sufficient to simply narrow an amplitude of current. It is because existence of both particles electrified positively and ones electrified negatively is a necessary condition for such adherence of polymer particles as mentioned above, and the intensity of electric charge can be determined by an amplitude of oscillating current.

Meanwhile, it has been surprisingly found that adherence of polymer particles to the inside wall of a reactor is not necessarily related to production of sheetlike polymers even in the course of polymerization.

While adherence of polymer particles to the inside wall of a reactor has been confirmed by a decrease in differential pressure between the upper and lower sections in a fluidized bed in the case where an amplitude of the measurements of current is wide, indicated values of a thermometer disposed close to the inside wall of the reactor exhibit lower values than that of a temperature in a polymer particle layer fluidized in the interior of the reactor in the case where an average value of oscillating current indicates zero or a positive value. This fact suggests no production of sheetlike polymer as mentioned hereinbelow. In reality, no sheet-like polymer was found in the case as described above from either a polymer which was drawn out from its polymerization system during polymerization, or remaining polymer particles in a reactor in case of stopping operation of the reactor. Also, no sheet-like polymer exists in the reactor.

On the contrary, in the case where a mean value of current oscillates while exhibiting negative value, indicated values of a thermometer disposed close to the inner wall of a reactor exhibit higher values than that of a temperature in a polymer particle layer fluidized in the interior of the reactor, so that this fact suggests production of sheet-like polymers. In fact, sheet-like polymers were found in the case as described above from a polymer which is drawn out from its polymerization system during polymerization as well as remaining polymer particles in a reactor in case of stopping operation of the reactor.

As described above, it has been newly found that a mean value of the measurements of oscillating current has a correlation with a catalyst concentration in the vicinity of a place where the measurement is effected. Strictly speaking, however, such a mean value of oscillating current does not directly relate to a concentration of catalyst, but it is considered to exhibit easiness of adherence of a catalyst (including polyolefin particle having polymerization activity) to the inner wall of a reactor. Anyway such knowledge justifies the recognition by the present inventors to the effect that localization of a catalyst is more important than mere adherence of polymer particles as a cause for producing sheet-like polymers.

Thus, either when polymerization is started by feeding a catalyst under such a condition that an average value of current is zero or a positive value, said current being due to the electric charge transferred from polymer particles electrified (which is a seed polymer introduced preliminarily in a reactor prior to commencement of polymerization) to an electrode disposed at a position where a possibility of producing sheet-like polymers exist in the reactor before polymerization is started by feeding a catalyst or the like, or when polymerization is effected under such a condition wherein such average value of current is zero or a positive value, sheet-like polymers are slightly produced, whereby either stable polymerizing reaction is started, or such a stable polymerization is continued.

For fixing an average value of current to zero or a positive value, an arbitrarily suitable means may be utilized. Such a purpose can be attained by adjusting, for example, preliminary treatment in a polymerization tank or a starting condition for polymerization. Otherwise such a method wherein a reaction is interrupted to stop tentatively feed of a catalyst and the like, and then it is confirmed by a suitable manner that an average value of oscillating current is zero or a positive value, thereafter such catalyst and the like are fed again may be utilized.

More specifically, for the sake of adjusting a mean value of current due to the electric charge transferred from polymer particles to an electrode disposed at a position where a sheet-like polymer will be produced in a reactor before polymerization is started to zero or a positive value, the following suitable methods may be utilized.

For example, the adjustment of an average value of current due to the electric charge transferred from polymer particles to an electrode disposed at a position where sheet-like polymers will be produced in a reactor can be achieved by changing a manner for introducing a seed polymer, its drying condition, and concentration of olefin gas or comonomer to be supplied to a reactor, or changing also conditions of operating temperature, operating pressure, rate of gas stream and the like.

As described above, a real mechanism for generating static electricity has not yet been completely elucidated in not only the case of vapor phase polymerization, but also in case of general phenomena.

In the present invention, however, it is important to effect operation for initiating polymerization or polymerizing operation itself in such a condition that an average value of current based on the electric charge transferred from polymer particles to an electrode disposed at a position where sheet-like polymers will be produced in a reactor is maintained at zero or a positive value. When such condition described above is established, prevention of producing sheet-like polymers can be attained. While the upper limit is not specifically restricted so far as a mean value of oscillating current is positive, generally the limit is +500 nA or less. There is a case where a width of amplitude of oscillating or fluctuating current reaches 2000 nA at the maximum, while in a stable condition where no production of sheet-like polymer is observed the width is comparatively narrow, and it exhibits occasionally a state of 50 nA or less. In this connection, however, it is usual that certain fluctuation is observed with respect to current value even in a stable state.

A position at which is disposed an electrode for measuring current due to the electric charge transferred from polymer particles is that at which sheet-like polymers will be produced in vapor phase polymerization, and such position resides generally near to a distributing plate on the upside thereof which is used for a fluidized bed. Such position is preliminarily determined based on experience. The electrode used is a metallic disk-shaped electrode having a diameter of 23 mm and a height of 10 mm. The electrode is usually made of stainless steel. This electrode is attached such that the tip end of the electrode protrudes 30 mm inside from the inner wall of a reactor.

Furthermore, as a device for measuring current in the present invention any well-known ammeter can be utilized. It is, however, noted that a mean value of such current is used in the present invention, since measurements of the current exhibit certain distribution as mentioned above. Since the distribution of measurements of the current distributes substantially symmetrically with the mean value as the central figure, for example, the central value within a range defined by measurements of the current may be used as such mean value. More specifically, a current value is measured for 10 minutes at a rate of 2.5 values/sec., and the resulting 1500 current values are simply averaged to obtain a mean or average value.

When polyolefin particles come in contact with an electrode, at least a part of the electric charge at the site where the polyolefin particles came in contact with the electrode transfers rapidly to the electrode. By such measurement of current based on electric charge, the purpose for the present invention can sufficiently be attained.

The method for measuring current due to electric charge transferred from electrified polymer particles to an electrode used in the present invention is superior to a conventional potential measuring method and cannot bear comparison therewith as one for a polymer particle group which is in a complicated electrified state of coexistence of positive and negative electric charge. The reasons of which will be described hereinbelow.

One reason is that potential of the electrode is always constant. In the method of the present invention, the potential of the electrode is always constant because any electric charge is not accumulated in the measuring system which is different from the conventional method for measuring electric potential. In the present invention, current flowing through the electrode and earth is usually measured, so that potential of the electrode is always equal to earth, that is zero. Strictly speaking, there arises electric potential difference by an amount corresponding to a product obtained from resistance of a path through which current flows and a current value. However, as is apparent from measuring of current, resistance of the path through which current flows is sufficiently small, and an amount of polymer particles electrified in the present invention is similarly extremely small, so that the current value is also small. Namely, potential difference due to flow of current is very small, so that it is negligible, and thus it may be considered that the potential of electrode is always substantially equal to earth.

As described above, since the potential of electrode is always equal to earth, an amount of electric charge transferred to an electrode in the case when polymer particles in a certain electrified condition come in contact with the electrode is always constant in response to the amount of electric charge. Namely, it may be concluded that a current value being the measured value is directly reflected by an electrified state of polymer particles. Furthermore, since the potential of the electrode is always equal to earth, frequency in contact of polymer particles with an electrode is not affected by Coulomb forces due to electrification of its measuring system itself.

Another characteristic feature of the method used in the present invention is to obtain information about distribution in an electrified amount of particles. It is impossible to obtain information with respect to distribution of an electrified amount in every polymer particle in the previously mentioned contact and non-contact methods for measuring potential. This is because the number of particles participating in the measurement is too many.

On the contrary, since the number of particles participating in the measurement is few in the method used in the present invention, such information with respect to distribution of an electrified amount can be obtained in every particle.

Such distribution of an electrified amount in every particle will be more fully described. It was described previously that an electrified state of particle (more strictly, a surface of particle) was not uniform. In this respect, if an electrified amount of particles can be measured with respect to an individual particle, distribution in an electrified amount of polymer particles can be obtained, but in reality it is very difficult.

In this respect, explanation will be made on an example wherein there is a group having distribution of a certain electrified amount. For simplicity, it is presumed that a particle group containing three particles each of which possesses an electrified amount of 0, 1, and 2, respectively.

In these circumstances, when an electrified amount of these individual particles can be measured, measured values of the particles appear in equal probability with respect to the respective values of 0, 1 and 2, so that correct distribution in electrified amount of the particle group is obtained. On one hand, in case of such a measuring method wherein two particles participate simultaneously in the measurement, three combination of (0, 1), (0, 2) and (1, 2) is considered. Thus, as measurements for electrified amount, their mean values 0.5, 1 and 1.5 are obtained in equal probability. Furthermore, in the case when three particles participate in the measurement, there is only a case of (0, 1, 2), so that a measured value 1 of electrified amount is always obtained.

It is understood that when only one particle is participating in the measurement, correct distribution of an electrified amount is obtained. If particles participating in the measurement are two, information as to distribution in an electrified amount of the particles is obtained although such information is not complete. Finally when particles participating in the measurement are three, no information is obtained as to distribution in an electrified amount of the particles. While the example mentioned herein might be an extreme case, in reality, when the particles participating in measurement increase, the influence of distribution in an electrified amount of the particles upon the measured values decreases. Accordingly, it may be concluded that such information as to the distribution of electrified amount of polymer particles obtained from the measured values also becomes less.

In a manner for measuring potential by means of a conventional contact way measuring method, when equilibrium is established by the amount of electric charge introduced from an electrode and the amount of electric charge leaking out from a measuring instrument, the potential of the electrode is the measured value. For this reason, a time required for obtaining one measured value is very long as compared with that of the method of the present invention. If a long period of time is required for its measurement, the number of particles participating in one measured value increases proportionally. More specifically, in a manner for measuring potential by means of conventional contact and non-contact way measuring methods, the number of the particles participating in a measured value is very numerous. Accordingly, in this case information as to distribution of electrified amount of polymer particles is not inevitably obtained as is apparent from the previously mentioned case where the particles participating in measurement are three.

In the method for measuring current due to the electric charge transferred from polymer particles to an electrode, the electric charge is not accumulated in its measuring system, but the electric charge transferred to the electrode flows promptly to earth. Since current is the differential of an electrified amount transferred with respect to time, the time required for determining a certain measured value is very short. Only the very few particles which were in contact with the electrode during such very short period of time participates in the measured value. More specifically, the method for measuring current due to the electric charge transferred from polymer particles to an electrode which is used in the present invention is characterized in that the number of particles participating in one measured value is very few in comparison with that of a manner for measuring potential by means of a conventional contact or non-contact way measuring method. Thus, while the former method is not perfect, certain information can be obtained with respect to distribution in electrified amount of polymer particles by this method used in the invention as in the previously mentioned case wherein two particles participate in its measurement. As described above, since the number of particles participating in measurement is very few in the method of the present invention as compared with a conventional manner for measuring potential being a contact or non-contact way measuring method, it will be understood that information as to an electrified state which could not have been obtained in a conventional measuring method can be obtained in the measuring method of the present invention.

Meanwhile, in a polymerization apparatus equipped with a reactor of the fluidized bed type, the weight of polymer particles in the reactor can be measured by detecting a difference between the upper and lower pressure, i.e. differential pressure in a layer of the polymer particles being in a fluidized state in the reactor. This is because weight of the polymer particles in a fluidized state is supported by fluidizing gas stream, so that the pressure under the polymer particle layer is higher than that above the polymer particle layer by such pressure corresponding to the weight of the polymer particles in the layers. When height of a polymer particle layer in the reactor is controlled so as to be substantially constant, differential pressure between the upper and lower sites of the polymer particle layer indicates a value in response to a fluidized bulk density of its polymer particle group.

In these circumstances, when polymer particles adhere to the inner wall of a reactor, the weight of such adhered polymer particles is supported by the inner wall of the reactor by means of Coulomb forces. For this reason, the differential pressure between the upper and lower sites of the polymer particle layer fluidized indicates a smaller value than that of a normal case. In the case where height of a polymer particle layer in a reactor is constant, decrement of its differential pressure corresponds to the weight of polymer particles adhered. Therefore, when differential pressure between the upper and lower sites in a fluidized bed is measured, it is possible to determine an amount of adhered polymer particles. In the meantime, if an inner diameter of reactor increases, then volume of a reacting section increases in proportion to the third power of the inner diameter. Also , the area of a reactor wall in the reacting section is proportional to the second power of an inner diameter of the reactor. Since a thickness of polymer particles adhering to the inside wall of a reactor is scarcely affected by an inner diameter of the reactor, a ratio of amount of adhered polymer particles with respect to total amount of polymer becomes small inversely proportional to the inner diameter of the reactor. For this reason, a method for determining an amount of polymer particles adhered to the inside wall of a reactor based on a change in differential pressure between the upper and lower sites of the polymer particle layer fluidized in the reactor is measurable in case of the reactor of a small scale, but is substantially unmeasurable in case of the reactor of a large scale.

When a temperature is measured by means of a thermometer disposed close to the inner wall of a reactor in place of the above described measuring method, it is possible to presume the magnitude in amount of reaction at that place, i.e. the magnitude of catalyst concentration at that place. It will be easily understood that the thermometers disposed close to the inside wall of a reactor indicate a higher temperature than that in the polymer particle layer fluidized in the case where a catalyst concentration is high in the place close to the inside wall of the reactor, in other words a large amount of reaction is observed in the place close to the inside wall of the reactor. In practice, when values indicated by the thermometers disposed close to the inner wall of a reactor are higher than that in a polymer particle layer, production of sheet-like polymers is observed.

EXAMPLE

An embodiment, examples and comparative examples of the present invention will be described in detail hereinbelow in conjunction with the accompanying drawings.

Preparation Example for Solid Catalyst Components

A 500 ml three-necked flask equipped with a stirrer and a reflux condenser was fed with 50 g of $SiO_2$ which was baked at 600° C., 160 ml of dehydrated hexane and 2.2 ml of titanium tetrachloride. The contents were allowed to react for 3 hours under the refluxing with hexane. After the reaction, the reaction mixture was cooled and 30 ml of diethylaluminum chloride solution in hexane (1 mmol/ml) was added. Reaction was further carried out for 2 hours under refluxing with hexane and the reaction mixture was dried under reduced pressure at 120° C. to remove the hexane. The thus obtained reaction product is hereinafter referred to as "Component I".

A stainless steel pot of 400 ml in internal volume containing 25 of stainless steel balls of 0.5 inch in diameter, was fed with 10 g of commercially available anhydrous magnesium chloride and 4.2 g of aluminum triethoxide. Ball milling was carried out at room temperature for 16 hours in an atmosphere of nitrogen. The thus obtained reaction product is hereinafter referred to as "Component II".

The above Component II (5.4 g) was dissolved into 160 ml of anhydrous ethanol and the whole solution was fed into a three-necked flask containing Component I. Reaction was carried out for 3 hours under refluxing with ethanol. After that, drying under reduced pressure was then carried out at 150° C. for 6 hours to obtain a solid catalyst component. The content of titanium was 15 mg per 1 g of the obtained solid catalyst component.

The reaction for the preparation of the solid catalyst component was performed in an inert gas atmosphere to avoid contamination with moisture.

Embodiment of Polymerization Apparatus for α-olefins

The reactor of a vapor phase fluidized bed type used in the following examples and comparative examples as well as the polymerizing condition therefor are as follows.

Figure 4:
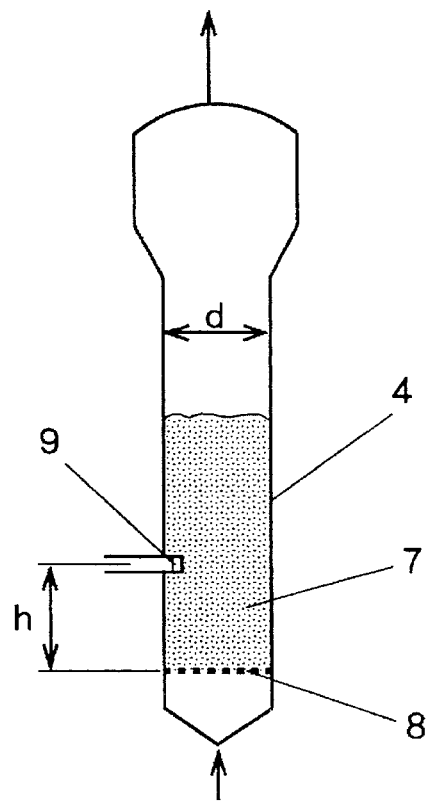
FIG. 4 is a schematic sectional view, in elevation, showing a fluidized bed reactor to which is attached a probe for measuring current.

As shown in FIG. 4, in a cylindrical vapor phase fluidized bed type reactor 4 for ethylene polymerization having 25 cm inner diameter of a reacting section, a stainless steel disk-shaped electrode 9 was disposed at a position 30 cm over a gas distributing plate 8 at which it is considered that sheet-like polymers will be produced within the fluidized bed 7, and a commercially available ammeter was connected to the electrode, whereby current due to the electric charge transferred from polyethylene particles to the electrode was measured.

Figure 5:
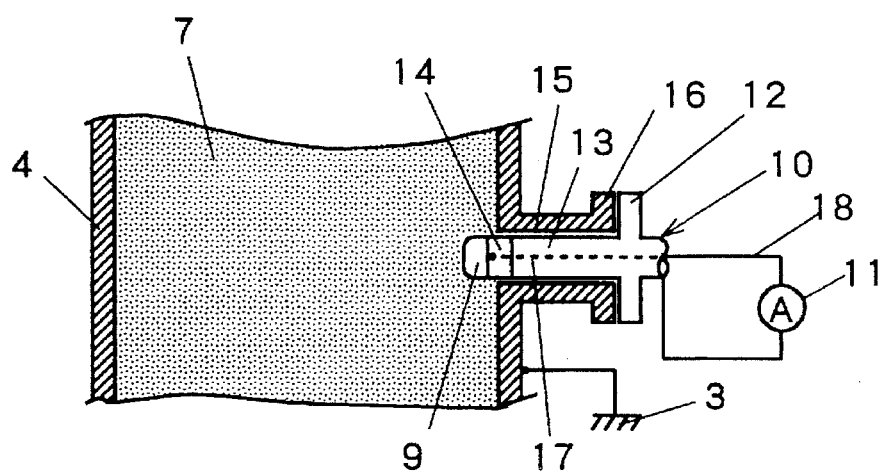
FIG. 5 is an explanatory view illustrating a current measuring device.

FIG. 5 shows the current measuring device described above wherein reference numeral 4 designates a metallic reactor, 7 a fluidized bed of polyethylene particles, and 10 a probe, respectively. A disk-shaped metal electrode 9 (made of stainless steel) is fixed to the extreme end of a metal pipe 13 (made of stainless steel) having a flange portion 12 through an insulating material 14. The probe 10 is inserted into the fluidized bed through an opening of an attaching section 15 formed on a side wall of the reactor 4. When a flange portion 16 of the attaching section 15 is allowed to abut upon the flange portion 12 of the probe 10, the metal electrode 9 is correctly positioned and the opening for attaching the probe is sealed. A lead metal rod 17 is connected to the metal electrode 9. The metal rod 17 is taken out outside the reactor 4 through a hollow section of the metal pipe 13, and is connected to the positive terminal of an ammeter 11 by way of a lead wire 18. The negative terminal of the ammeter 11 is connected to the metal pipe 13 of the probe 10, and then connected to earth through the reactor 4. The ammeter 11 used was a vibration reed type digital electrometer made by Advantest Co., Ltd.

The reactor was initially charged with 15 kg of polyethylene particles (linear low density polyethylene having an average particle diameter of 780 µm) as seed polymer. These polyethylene particles were circulated with nitrogen gas to form a fluidized bed, and then a raw material gas was supplied. The raw material gas consisting of ethylene, butene-1 and hydrogen was fed in such a manner that the linear low density polyethylene to be produced had a density of 0.919 $g/cm^3$ and a MFR (melt flow rate) of 0.8 dg/min. Operation of the reactor was effected under the condition of 85° C. temperature and 20 $kgf/cm^2 \cdot G$ pressure.

However, it is to be noted that experiments of the following examples and comparative examples are individually carried out. More specifically, these experiments were carried out at intervals of from several days to several weeks, respectively. In reality, a raw material in the polymerization reactor was purged with nitrogen and the reactor was opened in the air in accordance with a prescribed procedure after the respective experiments. In the initiation of the experiments, the prescribed procedure was carried out, respectively. Furthermore, while a manner for preparing a catalyst was the same with respect to the respective experiments, only the catalyst required for a certain experiment was separately prepared for use with a required amount therefor before that experiment was practiced.

Comparative Example 1

Linear low density polyethylene was polymerized by the use of the polymerization reactor under the condition described in said polymerization apparatus for α-olefin.

At the time of feeding the raw material gas, measurements of the current due to electric charge transferred from polyethylene particles, as seed polymer, to the electrode disposed inside the reactor were from −220 to +200 nA and the average value thereof −10 nA. On one hand, in place of the ammeter, an electrostatic voltmeter was connected to the electrode to measure potential of the electrode in accordance with the contact way measuring method. As a result, measurements of from −0.5 to 0 kV were obtained.

On the other hand, a weight of the linear low density polyethylene particles in the reactor calculated from differential pressure between the upper and lower layers thereof was a value smaller than about 3 kg from the weight of the seed polymer which was introduced initially into the reactor. Accordingly, an amount of adhered polymer which was estimated from the differential pressure was about 3 kg.

Then feed of the solid catalyst component containing Ti and Mg obtained as described in the above example for preparing said solid catalyst component as well as triethyl aluminum were started to carry out the reaction for polymerizing the linear low density polyethylene. However, soon after the indicated value of a thermometer disposed close to the inside wall of the reactor became higher indicating a higher temperature of the fluidized linear low density polyethylene particle layer. At the same time, a port for drawing out the linear low density polyethylene powder produced and the downstream piping therefor became clogged, so that the polymerization reaction was forced to stop. After shut-down, the reactor was inspected. As a result, it was found that a cause of clogging in the drawing-out system was a sheet-like polymer. In the reactor, such sheet-like polymer was also observed. Small sheet-like polymer was also found in the linear low density polyethylene powder exhausted from the reactor.

Comparative Example 2

Polymerization of linear low density polyethylene was continued by the use of the polymerization reactor under the condition described in said polymerization apparatus for α-olefin. Then, measurements of the current due to electric charge transferred from linear low density polyethylene particles to the electrode disposed inside the reactor changed gradually from −40 to +50 nA and the average value thereof was +5 nA, and finally these measurements and the average value thereof reached from −250 to +150 nA and −50 nA, respectively. During this change, differential pressure between the upper and lower layers of the linear low density polyethylene particles in the reactor decreased gradually in spite of maintaining a height of the linear low density polyethylene particle layer at a substantially constant value. Since a bulk density of the linear low density polyethylene powder drawn out from the reactor did not change, it may be presumed that the decrease in the differential pressure between the upper and lower layers of the linear low density polyethylene particles is due to adherence of the linear low density polyethylene particles to the inside wall of the reactor. From an amount of decrease in the differential pressure between the upper and lower layers of the linear low density polyethylene particles, an amount of the linear low density polyethylene particles adhered to the inner wall of the reactor may be estimated to be about 4 kg.

After the commencement of change in measurements of the current due to electric charge transferred from linear low density polyethylene particles to the electrode, an indicated value of the thermometer disposed close to the inner wall of the reactor came to be higher than temperatures in the fluidized linear low density polyethylene particle layer, and this resulted in a state indicating production of a sheet-like polymer.

Thereafter, it became difficult to drawn out the linear low density polyethylene particles produced from the reactor so that the polymerizing reaction was stopped.

After shut-down, the reactor was inspected. As a result, a sheet-like polymer was observed. A small sheet-like polymer was also found in the linear low density polyethylene powder exhausted from the reactor.

Comparative Example 3

Polymerization of linear low density polyethylene was continued by the use of the polymerization reactor under the condition described in said polymerization apparatus for α-olefin. Then, measurements of the current due to electric charge transferred from linear low density polyethylene particles to the electrode disposed inside the reactor changed gradually from −40 to +50 nA and the average value thereof was +5 nA, and finally these measurements and the average value thereof reached from −100 to +20 nA and −40 nA, respectively. From an amount of decrease in the differential pressure between the upper and lower layers of the linear low density polyethylene particles in the reactor, the polymer adhered to the inner wall of the reactor was estimated to be a small amount such as 1 kg or less.

After the commencement of change in measurements of the current due to electric charge transferred from linear low density polyethylene particles to the electrode, an indicated value of the thermometer disposed close to the inner wall of the reactor came to be higher than temperatures in the fluidized linear low density polyethylene particle layer, and this exhibiting a state indicating a possibility of production of a sheet-like polymer.

Thereafter, it became difficult to drawn out the linear low density polyethylene particles produced from the reactor so that the polymerizing reaction was unavoidably stopped.

After shut-down, the reactor was inspected. As a result, a sheet-like polymer was observed. A small sheet-like polymer was also found in the linear low density polyethylene powder exhausted from the reactor.

Example 1

Polymerization of linear low density polyethylene was stably continued by the use of the polymerization reactor under the condition described in said polymerization apparatus for α-olefin. Then, measurements of the current due to electric charge transferred from linear low density polyethylene particles to the electrode disposed inside the reactor indicated from −40 to +50 nA and the average value thereof was +5 nA.

From an amount of decrease in the differential pressure between the upper and lower layers of the linear low density polyethylene particles in the polymerization reactor, the polymer adhered to the inner wall of the reactor was estimated to be a small amount such as 1 kg or less.

Since a bulk density of the linear low density polyethylene powder drawn out from the reactor did not change, it was understood that the linear low density polyethylene particles adhered scarcely to the inside wall of the reactor.

After shut-down, the reactor was inspected and as a result, no sheet-like polymer was observed. Furthermore, no sheet-like polymer was also found in the linear low density polyethylene powder drawn out from the reactor.

On one hand, in place of the ammeter, an electrostatic voltmeter was connected to the electrode to measure potential of the electrode in accordance with the contact measuring method. As a result, the measurements of from 0 to +0.5 kV were obtained. These values are ones substantially near to the values of the electrostatic voltage measured in Comparative Example 1. In Comparative Example 1, however, width of the amplitude in oscillating current was wide, so that an amount of polymer particles adhered which is estimated from the differential pressure was remarkable in response to the aforesaid wide width. On the contrary, in the present example, amplitude of the oscillating current was comparatively narrow so that an amount of adhered polymer particles was small in response to such narrow amplitude.

As a matter of course, an average value of oscillating current indicated minus in Comparative Example 1 so that production of a sheet-like polymer was observed, while oscillating current indicated plus in the present example so that it exhibited suppression of producing the sheet-like polymer.

Example 2

Polymerization of linear low density polyethylene was continued by the use of the polymerization reactor under the condition described in said polymerization apparatus for α-olefin. Then, measurements of the current due to electric charge transferred from linear low density polyethylene particles to the electrode disposed inside the reactor changed gradually from −40 to +50 nA and the average value thereof was +5 nA, and finally these measurements and the average value thereof reached from −180 to +260 nA and +40 nA, respectively. During this change, differential pressure between the upper and lower layers of the linear low density polyethylene particles in the reactor decreased gradually in spite of maintaining a height of the linear low density polyethylene particle layer at a substantially constant value. Since a bulk density of the linear low density polyethylene powder drawn out from the reactor did not change, it may be presumed that the decrease in the differential pressure between the upper and lower layers of the linear low density polyethylene particles is due to adherence of the linear low density polyethylene particles to the inside wall of the reactor. From an amount of decrease in the differential pressure between the upper and lower layers of the linear low density polyethylene particles, an amount of the linear low density polyethylene particles adhered to the inner wall of the reactor was calculated to be about 2 kg.

After continuing the polymerization under such condition as described above, feed of the catalyst and the raw material was stopped, the operation was ceased, and the interior of the reactor was inspected. As a result, no sheet-like polymer was found. Also no sheet-like polymer was observed in the linear low density polyethylene powder drawn out from the reactor.

Example 3

Polymerization of linear low density polyethylene was continued by the use of the polymerization reactor under the condition described in said polymerization apparatus for α-olefin. Then, measurements of the current due to electric charge transferred from linear low density polyethylene particles to the electrode disposed inside the reactor changed gradually from −40 to +50 nA and the average value thereof was +5 nA, and finally these measurements and the average value thereof reached from −180 to +150 nA and −15 nA, respectively. During this change, differential pressure between the upper and lower layers of the linear low density polyethylene particles in the reactor decreased gradually in spite of maintaining a height of the linear low density polyethylene particle layer at a substantially constant value. Since a bulk density of the linear low density polyethylene powder drawn out from the reactor did not change, it may be presumed that the decrease in the differential pressure between the upper and lower layers of the linear low density polyethylene particles is due to adherence of the linear low density polyethylene particles to the inside wall of the reactor. From an amount of decrease in the differential pressure between the upper and lower layers of the linear low density polyethylene particles, an amount of the linear low density polyethylene particles adhered to the inner wall of the reactor was calculated to be about 3 kg.

After the commencement of change in measurements of the current due to electric charge transferred from linear low density polyethylene particles to the electrode, an indicated value of the thermometer disposed close to the inner wall of the reactor came to be higher than temperatures in the fluidized linear low density polyethylene particle layer, and this resulted in exhibiting a state indicating production of a sheet-like polymer.

Thereafter, the sheet-like polymer was observed in the linear low density polyethylene powder drawn out from the reactor, so that feed of the catalyst was temporarily stopped.

In this situation, a comonomer concentration in the polymerization gas was allowed to increase from 0.38 mole to 0.43 mole with respect to 1 mole of ethylene.

As a result, measurements of the current due to electric charge transferred from the linear low density polyethylene particles to the electrode changed, and finally these measurements and the average value thereof reached from −120 to +150 nA and +15 nA, respectively.

After that feed of the catalyst was started again, so that no sheet-like polymer was observed, and constant operation could be carried out. It was presumed that an amount of the polymer particles adhered to the inner wall of the reactor was estimated to be about 2 kg from an amount of decrease in the differential pressure between the upper and lower layers of the fluidized bed during operation.

After shut-down, the interior of the reactor was inspected so that no sheet-like polymer was observed.

According to the present invention, an average value of current due to the electric charge transferred from polyolefin particles to an electrode is allowed to be zero or a positive value in vapor phase polymerization of α-polyolefin by means of a fluidized bed reactor. As a result, it is possible to prevent production of sheet-like polymers and to stably continue the reaction for polymerization.

It will be appreciated by those of ordinary skill in the art that the present invention can be embodied in other specific forms without departing from the spirit or essential characteristics thereof.

The presently disclosed embodiment is therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method for polymerizing or copolymerizing at least one α-olefin in a vapor phase condition comprising supplying to a reactor, polymer particles, a catalyst composed of a solid catalyst component containing magnesium and at least one member selected from the group consisting of titanium and vanadium, and an organoaluminum compounds selected from the group consisting of (i) organoaluminum compounds by general formula:

$$R_mAl(OR')_nH_pX_q$$

wherein each of R and R' is a hydrocarbon group having 1 to 15 carbon atoms, R and R' are either the same or different, X is a halogen atom, m, n, p, and q are, respectively, $0<m\leq3$, $0\leq n<3$, $0\leq p<3$, and $0\leq q<3$, and $(m+n+p+q)=3$, and (ii) alkylated complexes of a metal of group I of the periodic table with aluminum represented by the general formula:

$$MAlR_4$$

wherein M is a metal selected from the group Consisting of Li, Na and K, and R is a hydrocarbon group having 1 to 15 carbon atoms, determining current due to the electric charge transferred from electrified polymer particles to an electrode disposed at a position where sheet-like polymers tend to be produced in the reactor, said transferring being caused as a result of contact of said polymer particles in the reactor with said electrode, and controlling said current such that the mean value or average value of said current obtained by averaging individual current values over a ten minute period is zero or a positive value during polymerization or copolymerization of said α-olefin at a temperature in the range of 10° C. to 200° C. and a pressure up to 70 kg/cm$^2$·G.

2. A method for polymerizing α-olefin in a vapor phase condition as claimed in claim 1 wherein said catalyst is composed of a solid catalyst component containing a tetravalent titanium compound and a magnesium halide, and an alkyl aluminum.

3. A method for polymerizing α-olefin in a vapor phase condition as claimed in claim 1 wherein said α-olefin contains 2 to 8 carbon atoms.

4. A method as claimed in claim 1 wherein said temperature is in the range of 40° C. to 150° C. and said pressure is 2 to 60 kg/cm$^2$·G.

5. A method as claimed in claim 1 wherein said mean value or average value of current is adjusted to zero or a positive value by increasing the concentration of the α-olefin or comonomer.

6. A method as claimed in claim 1 wherein said mean value or average value of current is adjusted to zero or a positive value by changing the polymerization temperature.

7. A method as claimed in claim 1 wherein said current is determined using an ammeter, the positive terminal of the ammeter being connected to said electrode and the negative terminal of the ammeter being connected to ground through said reactor.

8. A method as claimed in claim 1 wherein said mean or average value of current is adjusted to zero to 50 nA.

9. A method for reducing sheeting during polymerization or copolymerization of at least one α-olefin in a vapor phase condition comprising supplying to a reactor polymer particles, a catalyst composed of a solid catalyst component containing magnesium and at least one member selected from the group consisting of titanium and vanadium, and an organoaluminum compound selected from the group consisting of (i) organoaluminum compounds represented by the general formula:

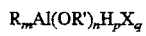

wherein each of R and R' is a hydrocarbon group having 1 to 15 carbon atoms, R and R' are either the same or different, X is a halogen atom, m, n, p, and q are, respectively, 0<m≦3, 0≦n<3, 0≦p<3, and 0≦q<3, and (m+n+p+q)=3, and (ii) alkylated complexes of a metal of group I of the periodic table with aluminum represented by the general formula:

wherein M is a metal selected from the group consisting of Li, Na and K, and R is a hydrocarbon group having 1 to 15 carbon atoms, determining current due to the electric charge transferred from electrified polymer particles to an electrode disposed at a position where sheet-like polymers are likely to be produced in the reactor, said transferring being caused as a result of contact of said polymer particles in the reactor with said electrode, and polymerizing or copolymerizing the α-olefin at a temperature in the range of 10° C. to 200° C. and a pressure up to 70 kg/cm$^2$·G when the mean value or average value of said current obtained by averaging individual current value over ten minute period is zero or a positive value, said current being determined using an ammeter, the positive terminal of the ammeter being connected to said electrode, and the negative terminal of the ammeter being connected to ground through said reactor.

10. A method as claimed in claim 9 wherein said organoaluminum compound is an alkyl aluminum, and said solid catalyst component contains a tetravalent titanium compound and a magnesium halide.

11. A method as claimed in claim 9 wherein said mean value or average value of current is adjusted to zero or a positive value by increasing the concentration of the α-olefin or comonomer.

12. A method as claimed in claim 9 wherein said mean value or average value of current is adjusted to zero or a positive value by changing the polymerization temperature.

13. A method as claimed in claim 11 wherein said mean or average value of current is adjusted to zero to 50 nA.

14. A method as claimed in claim 1 wherein said organoaluminum compound is selected from the group consisting of

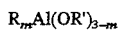

wherein each of R and R' is a hydrocarbon group having 1 to 15 carbon atoms and m is a numeral in the range of 1.5≦m≦3;

wherein R is a hydrocarbon group having 1 to 15 carbon atoms, X is a halogen atom and m is a numeral in the range of 0<m<3;

wherein R is a hydrocarbon group having 1 to 15 carbon atoms, m is a numeral in the range of 2≦m<3; and

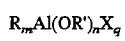

wherein each of R and R' is a hydrocarbon group having 1 to 15 carbon atoms, R and R' are either the same or different, X is a halogen atom, and m, n, and q are respectively numerals in the range of 0<m≦3, 0≦n<3, and 0≦q<3, and (m+n+q)=3.

15. A method as claimed in claim 9 wherein said organoaluminum compound is selected from the group consisting of

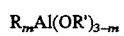

wherein each of R and R' is a hydrocarbon group having 1 to 15 carbon atoms and m is a numeral in the range of 1.5≦m≦3;

wherein R is a hydrocarbon group having 1 to 15 carbon atoms, X is a halogen atom and m is a numeral in the range of 0<m<3;

wherein R is a hydrocarbon group having 1 to 15 carbon atoms, m is a numeral in the range of 2≦m<3; and

wherein each of R and R' is a hydrocarbon group having 1 to 15 carbon atoms, R and R' are either the same or different, X is a halogen atom, and m, n, and q are respectively numerals in the range of $0<m\leq 3$, $0\leq n<3$, and $0\leq q<3$, and $(m+n+q)=3$.

16. A method for reducing sheeting during polymerization or copolymerization of at least one α-olefin in a vapor phase condition comprising supplying to a reactor polymer particles, a catalyst composed of a solid catalyst component containing magnesium and at least one member selected from the group consisting of titanium and vanadium, and an organoaluminum compound selected from the group consisting of (i) organoaluminum compounds represented by the general formula:

$$R_mAl(OR')_nH_pX_q$$

wherein each of R and R' is a hydrocarbon group having 1 to 15 carbon atoms, R and R' are either the same or different, X is a halogen atom, m, n, p, and q are, respectively, $0<m\leq 3$, $0\leq n<3$, $0\leq p<3$, and $0\leq q<3$, and $(m+n+p+q)=3$, and (ii) alkylated complexes of a metal of group I of the periodic table with aluminum represented by the general formula:

$$MAlR_4$$

wherein M is a metal selected from the group consisting of Li, Na and K, and R is a hydrocarbon group having 1 to 15 carbon atoms, determining oscillating current due to the electric charge transferred from positively and negatively electrified polymer particles to an electrode disposed at a position where sheet-like polymers are likely to be produced in the reactor, said transferring being caused as a result of contact of said polymer particles in the reactor with said electrode, and polymerizing or copolymerizing the α-olefin at a temperature in the range of 10° C. to 200° C. and a pressure up to 70 kg/cm²·G when the mean value or average value of said oscillating current is zero or a positive value, said oscillating current being determined using an ammeter, the positive terminal of the ammeter being connected to said electrode, and the negative terminal of the ammeter being connected to ground through said reactor.

17. A method as claimed in claim 1 wherein said current is controlled such that said mean or average value is a positive value during polymerization or copolymerization.

18. A method as claimed in claim 9 wherein said polymerizing or copolymerizing is conducted when said mean value or average value is a positive value.

19. A method as claimed in claim 16 wherein said polymerizing or copolymerizing is conducted when said mean value or average value is a positive value.

* * * * *